(12) United States Patent
Maeno et al.

(10) Patent No.: US 8,588,341 B2
(45) Date of Patent: Nov. 19, 2013

(54) DATA TRANSFER CIRCUIT AND DATA TRANSFER METHOD FOR CLOCK DOMAIN CROSSING

(75) Inventors: Takashi Maeno, Kyoto (JP); Masahiro Murakami, Kyoto (JP)

(73) Assignee: International Business Machines Corporation, Armonk, NY (US)

(*) Notice: Subject to any disclaimer, the term of this patent is extended or adjusted under 35 U.S.C. 154(b) by 112 days.

(21) Appl. No.: 13/267,184

(22) Filed: Oct. 6, 2011

(65) Prior Publication Data

US 2012/0105113 A1 May 3, 2012

(30) Foreign Application Priority Data

Oct. 29, 2010 (JP) .................................. 2010-244103

(51) Int. Cl.
*H03K 9/00* (2006.01)
*G06F 3/038* (2013.01)
*G06F 1/04* (2006.01)

(52) U.S. Cl.
USPC ............................ 375/316; 345/208; 713/600

(58) Field of Classification Search
USPC ........................................................ 375/316
See application file for complete search history.

(56) References Cited

U.S. PATENT DOCUMENTS

| | | | | |
|---|---|---|---|---|
| 6,480,946 B1* | 11/2002 | Tomishima et al. | ........... | 711/167 |
| 6,510,480 B1* | 1/2003 | Ito | ................. | 710/268 |
| 6,643,793 B1* | 11/2003 | Kouzuma | ...................... | 713/600 |
| 2002/0190974 A1* | 12/2002 | Morita | .......................... | 345/208 |
| 2004/0021717 A1* | 2/2004 | Nakajima et al. | ................ | 347/12 |
| 2004/0252551 A1* | 12/2004 | Iwata et al. | ................... | 365/158 |
| 2005/0117403 A1* | 6/2005 | Fujisawa | .................. | 365/189.05 |
| 2007/0139510 A1* | 6/2007 | Hamasaki et al. | ............. | 347/145 |
| 2009/0086075 A1* | 4/2009 | Saito et al. | .................... | 348/308 |

* cited by examiner

*Primary Examiner* — Leon-Viet Nguyen
*Assistant Examiner* — Sarah Hassan
(74) *Attorney, Agent, or Firm* — Kevin B. Anderson; Ian D. Mackinnon

(57) ABSTRACT

A circuit that transfers data between a first clock domain using a first clock and a second clock domain using a second clock synchronized with the first clock. The circuit comprises a data holding circuit operating at the first clock, an enable signal generation circuit connected to the data holding circuit. Preferably, the data transfer circuit includes an edge signal generation circuit connected to the data holding circuit, the edge signal generation circuit generating an edge signal allowing the data holding circuit to receive and send the data when edges of the first clock and the second clock align, and applying the edge signal to the data holding circuit.

11 Claims, 18 Drawing Sheets

TWO CLOCKS ARE
SYNCHRONOUS

CONVENTIONAL CIRCUIT

WAVEFORMS IN CONVENTIONAL METHOD

CONVENTIONAL CIRCUIT

CASES OF CLOCKS OF CLOCK DOMAINS

CONVENTIONAL CIRCUIT

WAVEFORMS IN ISSUING ENABLE SIGNAL WITH 200-MHz TIMING

CONVENTIONAL DATA TRANSFER (DOUBLE LATCH)

DATA HOLDING CIRCUIT

PROVIDING 200-MHz DATA

ENABLE SIGNAL GENERATION CIRCUIT (FOR 4-BIT DATA WIDTH)

PROVIDING 200-MHz DATA (IN SPECIAL CASE)

PROVIDING 266-MHz DATA (IN SPECIAL CASE)

DATA TRANSFER CIRCUIT AND DATA TRANSFER METHOD FOR CLOCK DOMAIN CROSSING

CROSS REFERENCE TO RELATED APPLICATION

The present application claims the benefit of priority to a Japanese Patent Application Serial Number 2010-244103 entitled "DATA TRANSFER CIRCUIT AND DATA TRANSFER METHOD FOR CLOCK DOMAIN CROSSING", filed Oct. 29, 2010 with the Japanese Intellectual Property Office, the content of which is incorporated herein by reference in its entirety.

TECHNICAL FIELD

The present invention relates to data processing using clocks, and particularly to a circuit and a method for Clock Domain Crossing (hereinafter referred to as CDC), in which data is transferred across clock domains.

BACKGROUND

A large-scale chip such as an SoC (System on a Chip) on which various circuits coexist often uses more than one clock and therefore requires a CDC circuit design for exchanging data between different clock domains. In an asynchronous circuit design, which presupposes misalignment of clock edges, various clock combinations can be selected. However, if data passing is not sufficiently reviewed, a failure may occur in an unexpected case. In a synchronous circuit design, which presupposes alignment of clock edges at certain regular intervals, circuit operations can be assured through a logical simulation and STA (Static Timing Analysis). Therefore, compared with the asynchronous circuit design, the synchronous circuit design advantageously allows for easy design.

FIG. 1 shows an exemplary conventional circuit using two synchronous clocks. An enable signal is used to pass data between clock domains. The frequency ratio of the clocks is supposed to be 1:n. FIG. 1 illustrates an example of synchronous clocks with the frequency ratio 1:2, one being 166.666 . . . MHz (hereinafter simply referred to as "166 MHz") of a period of 6 ns and another being 333.333 . . . MHz (hereinafter simply referred to as "333 MHz") of a period of 3 ns. At every 6 ns, edges of the two clocks coincide, i.e., rising edges or falling edges of the two clocks align. At the rising edge of the 333 MHz clock, data in a left-side flip-flop circuit (hereinafter referred to as "FF") is maintained when the enable signal is low (0) (this state is defined as "disabled"), and data received at the left flows to a right-side FF when the enable signal is high (1) (this state is defined as "enabled"). Thus, the left-side circuit including a multiplexer and the FF, although operating at 333 MHz (a period of 3 ns), can be operated at the same period (a period of 6 ns) as the FF operating at twice the period, i.e., 166 MHz (a period of 6 ns).

As shown in FIG. 2, the enable signal (see a waveform in a first row) is controlled to be high at rising edges of the 333-MHz clock when edges of the 333-MHz clock and the 166-MHz clock coincide (see points indicated by circles). In this manner, the timing of passing data from an FF operating at 333 MHz (see clocks and data in a second row) and receiving data directed to an FF operating at 333 MHz (see clocks and data in a fourth row) can be matched to an FF operating at 166 MHz (see clocks and data in a third row). Specifically, when the enable signal is high, the data occurring in the FF operating at 333 MHz (see the data in the second row) changes at the times (every 6 ns) of the rising edges of 166 MHz, so that the data can be passed even to the FF operating at 166 MHz at the times (every 6 ns) of the rising edges of 166 MHz (see the data in the third row indicated by solid arrows). Further, the data can be passed in a similar manner to the FF operating at 333 MHz (see the data in the fourth row indicated by dashed arrows). FIG. 3 shows a circuit further illustrating the data passed from the FF operating at 166 MHz to the FF operating at 333 MHz.

While an increase in the operation speed can be expected by increasing the clock frequency of a circuit, the maximum operation frequency of a circuit varies with circuit design. Therefore, as shown in FIG. 4, the frequency of a clock domain A may not be able to be increased above the upper limit of 333 MHz even when it is desired to increase the frequency of a clock domain B. If the clock frequencies of the both domains can be increased with the clock ratio 1:n maintained, the conventional technique shown in FIG. 1 can be applied. However, the technique in FIG. 1 cannot address the case of 333 MHz and 200 MHz as shown in the lower row in FIG. 4, in which the clock frequency ratio is 5:3.

In this case, data passing is possible by, for example, making the enable signal high at every 15 ns at which edges of the clocks coincide and passing data at every 15 ns, as shown in FIG. 5. However, this results in a data transfer rate of once in 15 ns (a speed of 66.666 . . . MHz), which is one third of the data transfer rate of even the slower FF operating at the 200-MHz clock.

FIG. 6 shows a case in which data is transferred three times in 15 ns with the 200-MHz timing according to a conventional method. In FIG. 6, the timing with which the enable signal (see a waveform in a first row) is high is adjusted so that data is transferred at a rate of three times in 15 ns in the circuit shown in FIG. 5. In this case, when the enable signal is high, data from the FF operating at 333 MHz (see clocks and data in a second row) to the FF operating at 200 MHz (see clocks and data in a third row) is correctly transferred (in the order of a, b, c, d, e) (see data transfer indicated by solid arrows). However, the data is not successfully transferred from the FF operating at 200 MHz to the FF operating at 333 MHz (see clocks and data in a fourth row) with the loss of the data b and e (see data transfer indicated by dashed arrows and dashed circles). Particularly, immediately after the data is passed to the FF operating at 200 MHz at 5 ns, the data is passed to the FF operating at 333 MHz at 6 ns. That is, the setup time is 1 or 2 ns, resulting in severe data passing timing.

In a synchronous circuit design, combinations of available clocks are limited. Trying to transfer data fast leads to inability to correctly transfer the data due to failures such as data loss. Conventionally, a dedicated circuit customized by considering data passing directions for a clock combination must be designed, and changing the clock combination requires another circuit. In an asynchronous circuit design such as based on double latch, as shown in FIG. 7, the both clock domains need to be taken into account to provide a latch connection circuit in each clock domain. The asynchronous processing such as based on double latch causes losses at the time of data passing. When the clock combination is changed, the circuit needs to be reviewed and possibly redesigned.

Patent Literature 1 describes providing a function for achieving signal synchronization between modules operating at clocks with a non-integer multiple ratio through a simple method in a semiconductor integrated circuit device.

Patent Literature 2 describes a method and an apparatus for generating a phase control clock signal capable of outputting a clock signal at a frequency in a non-integer multiple ratio relationship with an external system clock.

SUMMARY OF INVENTION

The present invention can solve the problem of inability to correctly transfer data due to failures such as data loss in data transfer because of limited combinations of available clocks in a synchronous circuit design. Particularly, an object of the present invention is to realize a circuit and a method that enable flexible selection of a clock combination and fast data transfer between clock domains without failures such as data loss. Objects of the present invention include providing a circuit and a method for fast data transfer between clock domains that use synchronized clocks.

For transferring data between a first clock domain using a first clock and a second clock domain using a second clock synchronized with the first clock, a data transfer circuit in an aspect provided by the present invention at least includes: a data holding circuit operating at the first clock to receive, hold, and send the data; and an enable signal generation circuit connected to the data holding circuit. The enable signal generation circuit generates an input enable signal allowing the data holding circuit to receive the data, and an output enable signal allowing the data holding circuit to send the received data. The enable signal generation circuit enables the input enable signal and the output enable signal so that the input enable signal and the output enable signal are enabled when edges of the first clock and the second clock align. For the first clock and the second clock in a case where the first clock is faster than the second clock, the enable signal generation circuit enables the input enable signal so that the input enable signal is enabled at a predetermined one of edges of each clock pulse of the first clock precedent to and close to a predetermined one of edges of each clock pulse of the second clock occurring after the edge alignment in an interval between the edge alignment and a next edge alignment, and enables the output enable signal so that the output enable signal is enabled at a predetermined one of edges of each clock pulse of the first clock subsequent to and close to a predetermined one of edges of each clock pulse of the second clock occurring after the edge alignment. The enable signal generation circuit applies the input enable signal and the output enable signal to the data holding circuit.

Preferably, the data transfer circuit includes an edge signal generation circuit connected to the data holding circuit, the edge signal generation circuit generating an edge signal allowing the data holding circuit to receive and send the data when edges of the first clock and the second clock align, and applying the edge signal to the data holding circuit. Preferably, the edge signal generation circuit includes generating the edge signal by ANDing the input enable signal and the output enable signal. Preferably, the enable signal generation circuit includes: a timing signal holding circuit operating at the first clock to receive, hold, and send a timing signal for the time when edges of the first clock and the second clock align; an input enable signal generator operating at the first clock to receive inputs of the number of clock pulses of the first clock $N_{1st}$ and the number of clock pulses of the second clock $N_{2nd}$ between an edge alignment and a next edge alignment of the first clock and the second clock, and the timing signal, and generate the input enable signal; and an output enable signal generator operating at the first clock to receive inputs of the $N_{1st}$, the $N_{2nd}$, and the timing signal, and generate the output enable signal.

Preferably, the input enable signal generator includes: a count-down counter that receives an input of the $N_{1st}$, is reset upon receiving an input of the timing signal, is set to $N_{1st}-1$ upon being reset, performs count-down operation to 0 at the first clock, and outputs a count value $CNT_{down}$; a first operation circuit connected to the count-down counter to receive inputs of the $CNT_{down}$, the $N_{1st}$, and the $N_{2nd}$, calculate $CNT_{down}*N_{2nd}/N_{1st}$, and output a calculated value; a first differential circuit operating at the first clock and connected to the first operation circuit to receive an input of the calculated value of the first operation circuit and to output 1 if the input calculated value is different from a previous value and output 0 otherwise; and a first OR circuit connected to the first differential circuit and the timing signal holding circuit to OR an input from the first differential circuit and an input from the timing signal holding circuit and provide an output as the input enable signal.

Preferably, the output enable signal generator includes: a count-up counter that receives an input of the $N_{1st}$, is reset upon receiving an input of the timing signal, is set to 0 upon being reset, performs count-up operation to $N_{1st}-1$ at the first clock, and outputs a count value $CNT_{up}$; a second operation circuit connected to the count-up counter to receive inputs of the $CNT_{up}$, the $N_{1st}$, and the $N_{2nd}$, calculate $CNT_{up}*N_{2nd}/N_{1st}$, and output a calculated value; a second differential circuit operating at the first clock and connected to the second operation circuit to receive an input of the calculated value of the second operation circuit and to output 1 if the input calculated value is different from a previous value and output 0 otherwise; and a second OR circuit connected to the second differential circuit and the timing signal holding circuit to OR an input from the second differential circuit and an input from the timing signal holding circuit and provide an output as the output enable signal.

A data transfer method in an aspect provided by the present invention, transferring data between a first clock domain using a first clock and a second clock domain using a second clock synchronized with the first clock, at least includes: operating a data holding circuit at the first clock; enabling an input enable signal allowing the data holding circuit to receive the data and an output enable signal allowing the data holding circuit to send the received data so that the input enable signal and the output enable signal are enabled when edges of the first clock and the second clock align; for the first clock and the second clock in a case where the first clock is faster than the second clock, enabling the input enable signal so that the input enable signal is enabled at a predetermined one of edges of each clock pulse of the first clock precedent to and close to a predetermined one of edges of each clock pulse of the second clock occurring after the edge alignment in an interval between the edge alignment and a next edge alignment; applying the input enable signal to the data holding circuit to receive the data at the data holding circuit; enabling the output enable signal so that the output enable signal is enabled at a predetermined one of edges of each clock pulse of the first clock subsequent to and close to a predetermined one of edges of each clock pulse of the second clock occurring after the edge alignment; and applying the output enable signal to the data holding circuit to send the received data from the data holding circuit.

Preferably, the data transfer method includes generating an edge signal allowing the data holding circuit to receive and send the data when edges of the first clock and the second clock align, and applying the edge signal to the data holding circuit to receive the data at the data holding circuit and send the data from the data holding circuit. Preferably, generating the edge signal includes generating the edge signal by ANDing the input enable signal and the output enable signal.

Where $N_{1st}$ and $N_{2nd}$ denote the number of clock pulses of the first clock and the number of clock pulses of the second clock, respectively, between an edge alignment and a next edge alignment of the first clock and the second clock, $CNT_{down}$ denotes a cyclical counter value starting at a point of an edge alignment of the first clock and the second clock and counted down as $N_{1st}-1, N_{1st}-2, \ldots, 1, 0, N_{1st}-1, N_{1st}-2, \ldots$, $CNT_{up}$ denotes a cyclical counter value starting at the point of the edge alignment and counted up as $0, 1, \ldots, N_{1st}-2, N_{1st}-1, 0, 1, \ldots$, and INT(a) denotes a function that discards a fractional portion of a value of a, the data transfer method preferably includes: generating the input enable signal to be enabled at a point when a value of INT($CNT_{down}*N_{2nd}/N_{1st}$) changes and at the point of the edge alignment, and to be disabled at other points; and generating the output enable signal to be enabled at a point when a value of INT($CNT_{up}*N_{2nd}/N_{1st}$) changes and at the point of the edge alignment, and to be disabled at other points.

Preferably, the predetermined one of the edges of each clock pulse of the first clock and the predetermined one of the edges of each clock pulse of the second clock are rising edges or falling edges.

According to the present invention, a circuit and a method that enable flexible selection of a clock combination and fast data transfer between clock domains without failures such as data loss are realized. Particularly, a circuit and a method for fast data transfer between clock domains that use synchronized clocks are provided, and selective changes in clock combination can be addressed without modification of the circuit itself.

DETAILED DESCRIPTION

The best mode for implementing the present invention will be described in detail below with reference to the drawings. Embodiments below are not intended to limit the present invention set forth in claims, and not all combinations of features described in the embodiments may be essential to the solution of the present invention. The present invention can be implemented in many different aspects and should not be construed exclusively within the content of the described embodiments. Throughout the description of the embodiments, like components and elements are given like numbers.

Figure 8:
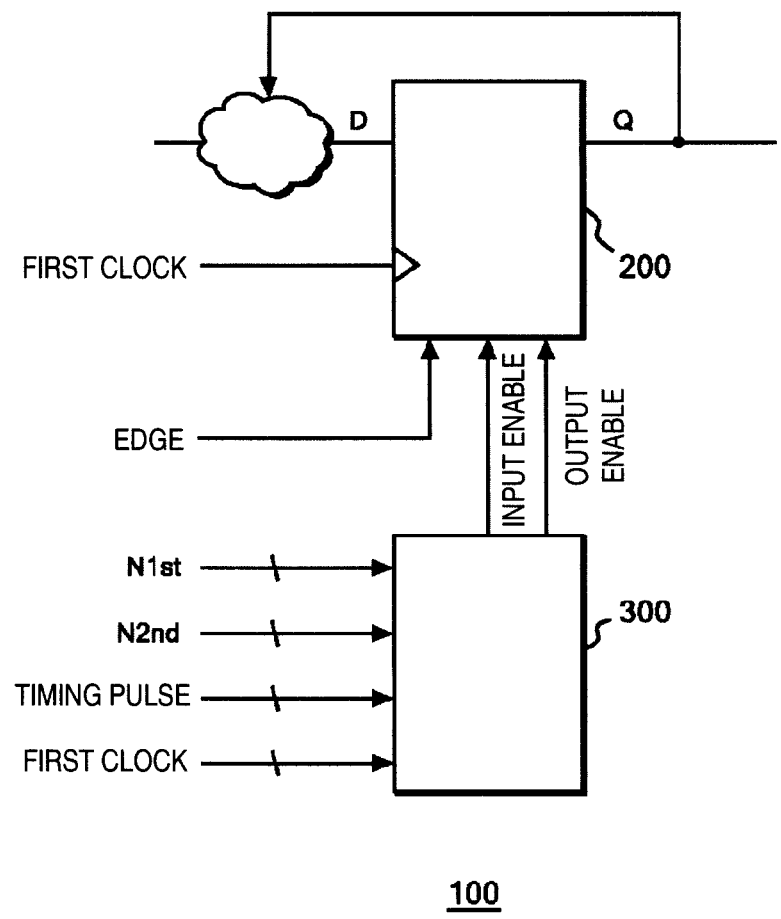
FIG. 8 is a schematic diagram of a data transfer circuit according to an embodiment of the present invention.

FIG. 8 shows a schematic of a data transfer circuit 100 according to an embodiment of the present invention. The data transfer circuit 100 includes a data holding circuit 200, and an enable signal generation circuit 300 connected to the data holding circuit 200. As shown in FIG. 8, the data holding circuit 200 receives an input of data from, e.g., a combinational circuit, and operates at a first clock, e.g., 333 MHz but does not operate at a second clock, e.g., 166 MHz, synchronized with the first clock. In the data holding circuit 200, a data signal at either the first clock or the second clock is received from D as an input, and a data signal that can be received at either the first clock or the second clock is sent from Q as an output. An edge signal used when edges of the first clock and the second clock align, and an input enable signal and an output enable signal from the enable signal generation circuit 300, are applied to the data holding circuit 200. The data holding circuit 200 preferably includes an FF, namely, a flip-flop circuit.

The input enable signal and the output enable signal are signals enabled when edges of the first clock and the second clock align. Further, for the first clock and the second clock in a case where the first clock is faster than the second clock, particularly such that the frequency ratio between the first clock and the second clock is m:n, where m and n are integers (m>n≥1), the input enable signal is a signal that allows the data holding circuit 200 to receive data at a predetermined one of edges of each clock pulse of the first clock precedent to and close to a predetermined one of edges of each clock pulse of the second clock occurring after an edge alignment in an interval between the edge alignment and a next edge alignment of the first clock and the second clock. The output enable signal is a signal that allows the data holding circuit 200 to send the received data at a predetermined one of edges of each clock pulse of the first clock subsequent to and close to a predetermined one of edges of each clock pulse of the second clock occurring after the edge alignment. If the enable timing is determined by calculation for example, the input enable signal and the output enable signal are generated by using the value of $N_{1st}$, the value of $N_{2nd}$, a timing pulse, and the first clock, which are input to the enable signal generation circuit 300. $N_{1st}$ is the number of clock pulses of the first clock and $N_{2nd}$ is the number of clock pulses of the second clock between an edge alignment and a next edge alignment of the first clock and the second clock. The timing pulse is used as a timing signal for the time when edges of the first clock and the second clock align.

Except for a special case to be described below, the edge signal can be generated by ANDing the input enable signal and the output enable signal because the input enable signal and the output enable signal are both enabled and overlap when edges of the first clock and the second clock align. However, for certain combinations of the first clock and the second clock, the input enable signal and the output enable signal may be both enabled and overlap even at times other than when edges of the first clock and the second clock align. For a clock combination causing this situation, the edge signal is not generated by ANDing the input enable signal and the output enable signal and needs to be generated in another way. Also, the circuit is not used in the same manner as a normal FF, that is, the output Q is not fed back as a signal for the input D.

Figure 9:
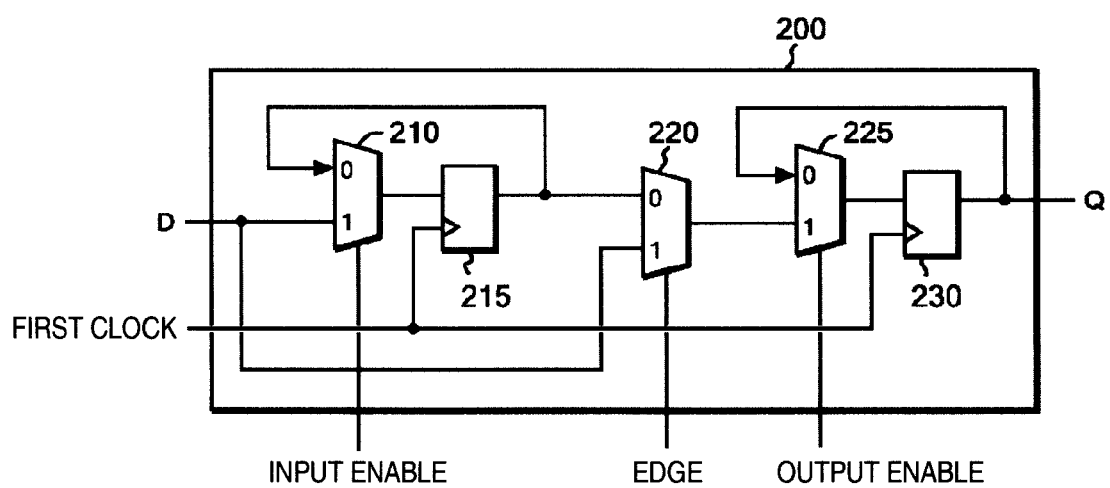
FIG. 9 is a circuit diagram showing an example of a data holding circuit.

FIG. 9 shows a circuit example of the data holding circuit 200. The timing for data to be received at the input D is controlled with the input enable signal applied to a multiplexer 210, and the data is taken into an FF 215 operating at the first clock, e.g., 333 MHz. The data taken into the FF 215 arrives at a multiplexer 225 via a multiplexer 220. The timing for the data to be taken into an FF 230 operating at the first clock and sent to the output Q is controlled with the output enable signal applied to the multiplexer 225. When clock edges of the first clock and the second clock (slower than the first clock), e.g., 200 MHz, synchronized with the first clock coincide, i.e., align, the edge signal for the time of clock edge alignment applied to the multiplexer 220 is used to directly provide the data at D as the output at Q so that the circuit operates in the same manner as a normal FF. The edge signal is high (1) when clock edges coincide, and low (0) at other times. Since the input and output enable signals are high (1) when the edge signal is high (1), the data holding circuit 200 in FIG. 9 operates as a single FF (as if only one FF (FF 230) exists). That is, the data at the input D directly appears at the output Q.

By operating the circuit in FIG. 9 at the first clock (333 MHz) and appropriately controlling the input enable signal, the output enable signal, and the edge signal, data passing (200 MHz→333 MHz, 333 MHz→200 MHz) between a clock domain using the first clock (333 MHz) and a clock domain using the second clock (200 MHz) can be achieved at a data transfer rate of 200 MHz.

Figure 10:
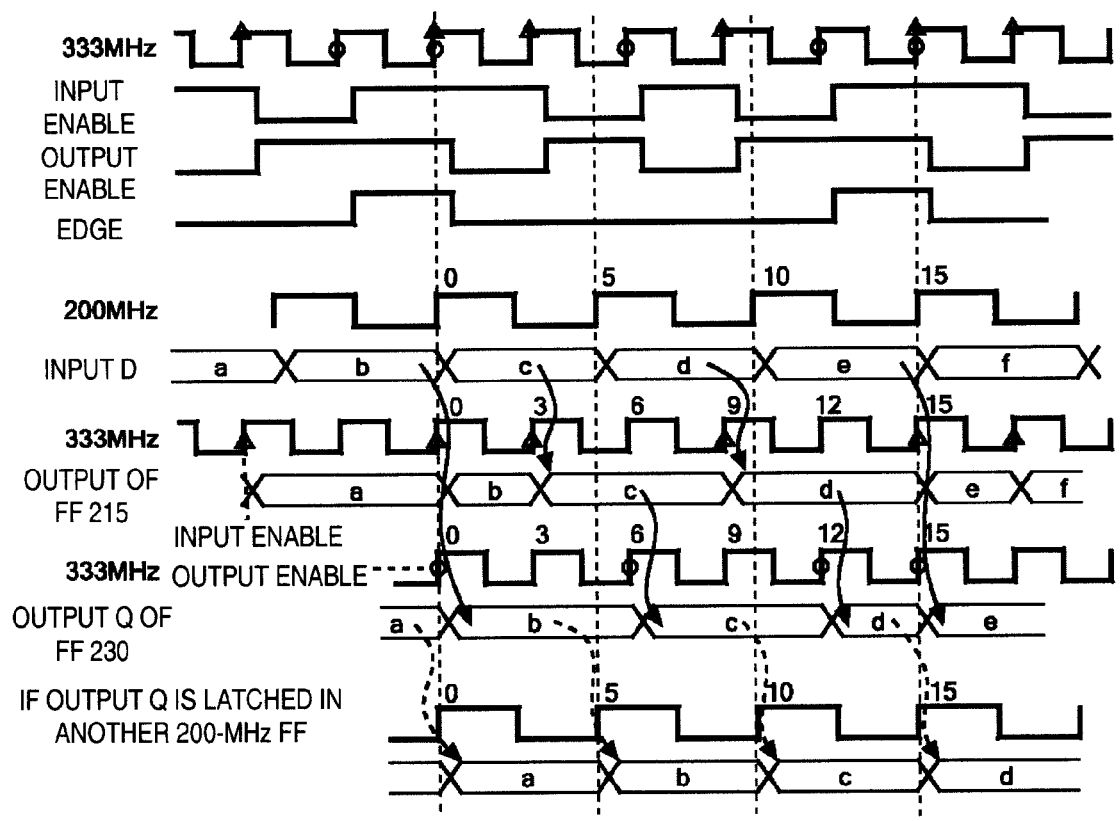
FIG. 10 is a timing waveform diagram in providing data based on a slower clock (200 MHz)

FIG. 10 shows the timing as a waveform of each signal in a case that data from the clock domain using the second clock (200 MHz) slower than the first clock is provided to the input D. The data can be received at rising edges of the first clock (333 MHz) when the input enable signal is high. This data reception timing is indicated by triangles at the rising edges in a clock waveform of 333 MHz. The data can be sent at rising edges of the first clock (333 MHz) when the output enable signal is high. This data sending timing is indicated by circles at the rising edges in a clock waveform of 333 MHz. Although rising edges of the clock is used for determining the timings, falling edges of the clock may be used to determine the timings.

Also, the data output from the FF 215 and the data at the output Q of the FF 230 in the circuit illustrated in FIG. 9 are shown for the data a, b, c, d, . . . arriving at the input D with the 200-MHz timing (at every 5 ns, see points indicated by vertical dotted lines). As shown in FIG. 10, the data from the clock domain using 200 MHz to the input D is received at the FF 215 with the reception timing at the edges marked with the triangles, and sent to the output Q of the FF 230 with the sending timing at the edges marked with the circles. In this manner, the data can be output to the output Q at a data transfer rate of three times in 15 ns (a data transfer rate of 200 MHz) (see data transitions indicated by solid arrows). Even if the data output to the output Q is further latched in another FF of 200 MHz, the data can be passed without data reordering or data loss (see data transitions indicated by dashed arrows). When clock edges of the both clocks of 200 MHz and 333 MHz align, the edge signal is high and the circuit operates in the same manner as a normal FF. That is, the data at the input D is output to the output Q of the FF 230 without being temporarily latched in the FF 215 (see data transitions at 0 ns and 15 ns).

Figure 11:
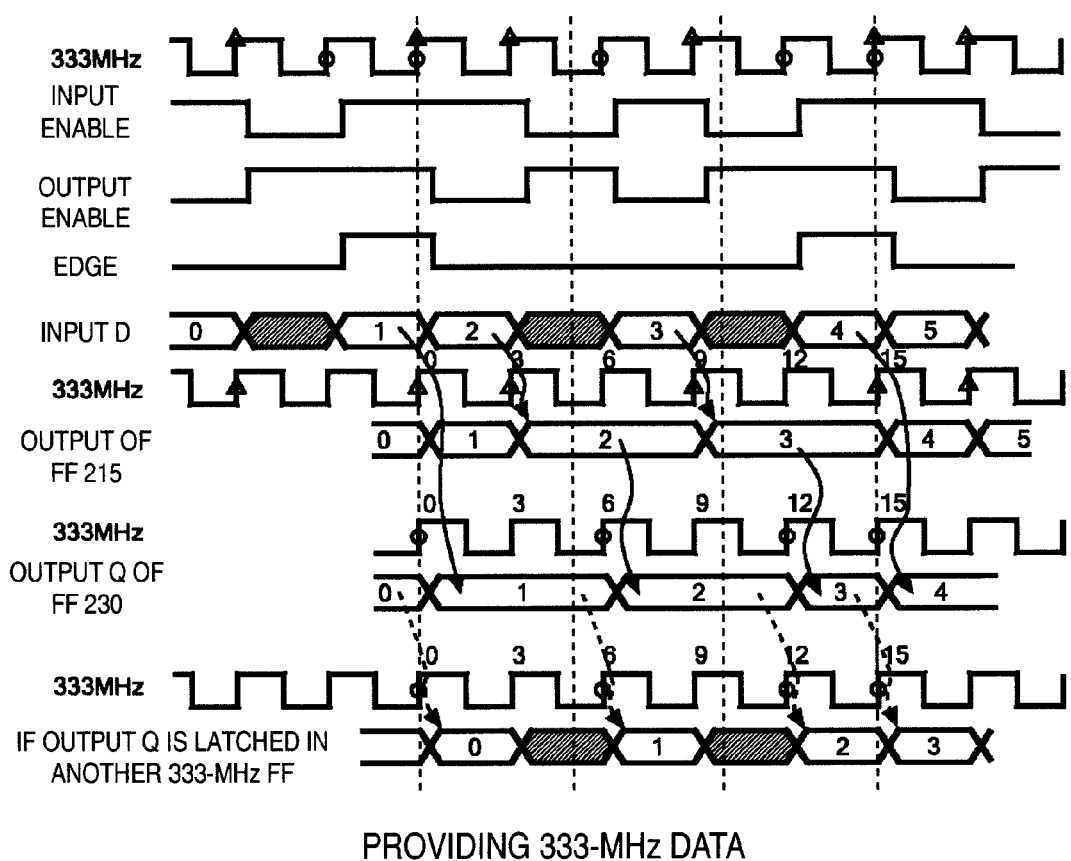
FIG. 11 is a timing waveform diagram in providing data based on a faster clock (333 MHz)

Since the circuit in FIG. 9 operates at the first clock (333 MHz), the circuit can receive and pass data from and to a circuit in a 333-MHz clock domain without problems. FIG. 11 shows the timing as a waveform of each signal in a case that data from a clock domain using the first clock (333 MHz) is provided to the input D. As described for FIG. 10, the data reception timing is indicated by triangles at rising edges of a clock waveform of 333 MHz, and the data sending timing is indicated by circles at rising edges of a clock waveform of 333 MHz. In the circuit in FIG. 9, the data that changes at the clock of 333 MHz is received with the timing controlled by the input enable signal slower than 333 MHz. Therefore, this time, the data is selectively received. Shaded portions are not to be sent and are regarded as "don't care" at the input D.

The data (0, 1, 2, 3, 4 . . . ) at the input D is received at the FF 215 with the reception timing at the edges marked with the triangles, and sent to the output Q of the FF 230 with the sending timing at the edges marked with the circles. In this manner, the data can be transferred at a data transfer rate of three times in 15 ns (a data transfer rate of 200 MHz) (see data transitions indicated by solid arrows). Even if the data output to the output Q is further latched in another FF of 333 MHz, the data can be passed without data reordering or data loss (see data transitions indicated by dashed arrows) although the data is selectively passed. Again, when clock edges of the both clocks of 200 MHz and 333 MHz align, the edge signal is high and the circuit operates in the same manner as a normal FF. That is, the data at the input D is output to the output Q of the FF 230 without being temporarily latched in the FF 215 (see data transitions at 0 ns and 15 ns).

Figure 12:
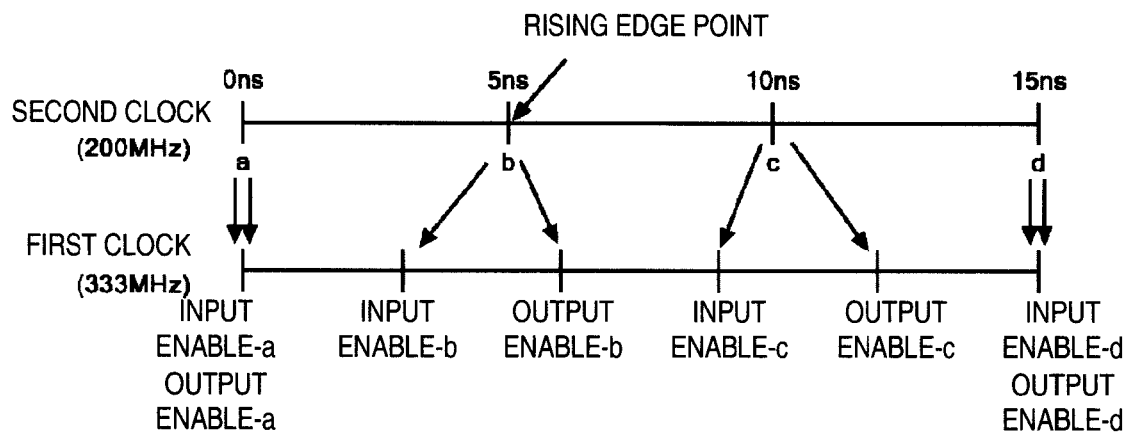
FIG. 12 is a diagram showing an example of the timing of (the manner of generating) input and output enable signals.

Now, the timings of the input enable signal, the output enable signal, and the edge signal will be described. FIG. 12 shows the manner of generating the input enable signal and the output enable signal in an exemplary case of clocks of 200 MHz and 333 MHz. While the signals are controlled at the faster first clock (333 MHz), the signals are generated with reference to the timing of rising edges of the slower second clock (200 MHz). The timings of the input enable signals a to d and the output enable signals a to d are determined according to rising edge points a, b, c, and d of the second clock (200 MHz). At 0 ns and 15 ns, when edges of the both clocks coincide, the edge signal is high and the input enable signal and the output enable signal are simultaneously asserted, i.e., enabled. In the example of FIG. 12, these points correspond to the points a and d.

When edges of the both clocks do not coincide, such as at the points b and c, the input enable signal is enabled so that a rising edge point of the firsts clock (333 MHz) precedent to and close to a rising edge point of the second clock (200 MHz) is the timing of receiving the input data (see the input enable signals b and c). Also, the output enable signal is enabled so that a rising edge point of the first clock (333 MHz) subsequent to and close to a rising edge point of the second clock (200 MHz) is the timing of sending the output data (see the output enable signals b and c). Here, the order of the input enable signals and the order of the output enable signals are prevented from overlapping and reordering. The order of a precedent output enable signal and a subsequent input enable signal is also prevented from reordering. For example, the output enable signal b and the input enable signal c can overlap, but their order cannot be changed. The special case in which the output enable signal b and the input enable signal c overlap will be described below.

To increase the setup time for the circuit, the circuit in FIG. 9 needs to latch and send data as soon as possible. Consequently, the most efficient points as the timings of selectively enabling the input and output enable signals are rising edge points of the faster first clock (333 MHz) precedent and subsequent to and closest to rising edge points of the slower second clock (200 MHz), as shown in FIG. 12.

An exemplary manner of enable signal generation for selectively enabling the input and output enable signals at these efficient points will be described. The points, i.e., the points of time, for selectively enabling the two types of input and output enable signals can be calculated by using the timing of edge coincidence of the both clocks and the clock ratio of the both clocks.

First, definitions of $N_{1st}$, $N_{2nd}$, $CNT_{down}$, $CNT_{up}$, and INT(a) are provided as follows.

$N_{1st}$: the number of clock pulses of the first clock between an edge coincidence and a next edge coincidence of the both clocks (in the example, five clock pulses occur in 15 ns at a clock of 333 MHz and therefore $N_{1st}=5$)

$N_{2nd}$: the number of clock pulses of the second clock between an edge coincidence and a next edge coincidence of the both clocks (in the example, three clock pulses occur in 15 ns at a clock of 200 MHz and therefore $N_{2nd}=3$)

$CNT_{down}$: a cyclical counter value starting at the point of an edge coincidence of the both clocks and counted down as $N_{1st}-1, N_{1st}-2, \ldots, 1, 0, N_{1st}-1, N_{1st}-2, \ldots$.

$CNT_{up}$: a cyclical counter value starting at the point of an edge coincidence of the both clocks and counted up as $0, 1, \ldots, N_{1st}-2, N_{1st}-1, 0, 1, \ldots$.

INT(a): a function that discards a fractional portion of the value of (a)

The above variables and function can be used to define the timings of generating the two types of input and output enable signals as follows.

input enable signal: the signal takes 1 (enabled) when the value of $INT(CNT_{down}*N_{2nd}/N_{1st})$ changes and when edges of the both clocks coincide, and takes 0 (disabled) at other points.
   output enable signal: the signal takes 1 (enabled) when the value of $INT(CNT_{up}*N_{2nd}/N_{1st})$ changes and when edges of the both clocks coincide, and takes 0 (disabled) at other points.

Table 1 shows an example of generating the two types of input and output enable signals with the above formulas (for the clocks of 333 MHz and 200 MHz). Points at which edges of the clocks of 333 MHz and 200 MHz align are marked with x above the times 0 ns, 15 ns, and 30 ns. The timing of enabling the input enable signal is marked with x in the row of input enable points, and the timing of enabling the output enable signal is marked with x in the row of output enable points.

For the input enable signal, the value of $INT(CNT_{down}*N_{2nd}/N_{1st})$ changes at the edge alignment points (0 ns, 15 ns, and 30 ns) and 3 ns, 9 ns, 18 ns, 24 ns, and 33 ns. Therefore these points are selected as the enable timing, and the input enable signal is generated to be enabled at these points. Similarly, for the output enable signal, the value of $INT(CNT_{up}*N_{2nd}/N_{1st})$ changes at the edge alignment points (0 ns, 15 ns, and 30 ns) and 6 ns, 12 ns, 21 ns, 27 ns, and 36 ns. Therefore these points are selected as the enable timing, and the output enable signal is generated to be enabled at these points.

The generation of the enable signals may not be based on calculation using the above formulas. Rather, the points precedent to and subsequent to the edges of the slower clock may be manually determined and set as appropriate in advance, and these points may be cyclically used. This allows the enable signals to be generated without calculation formulas.

Figure 13:
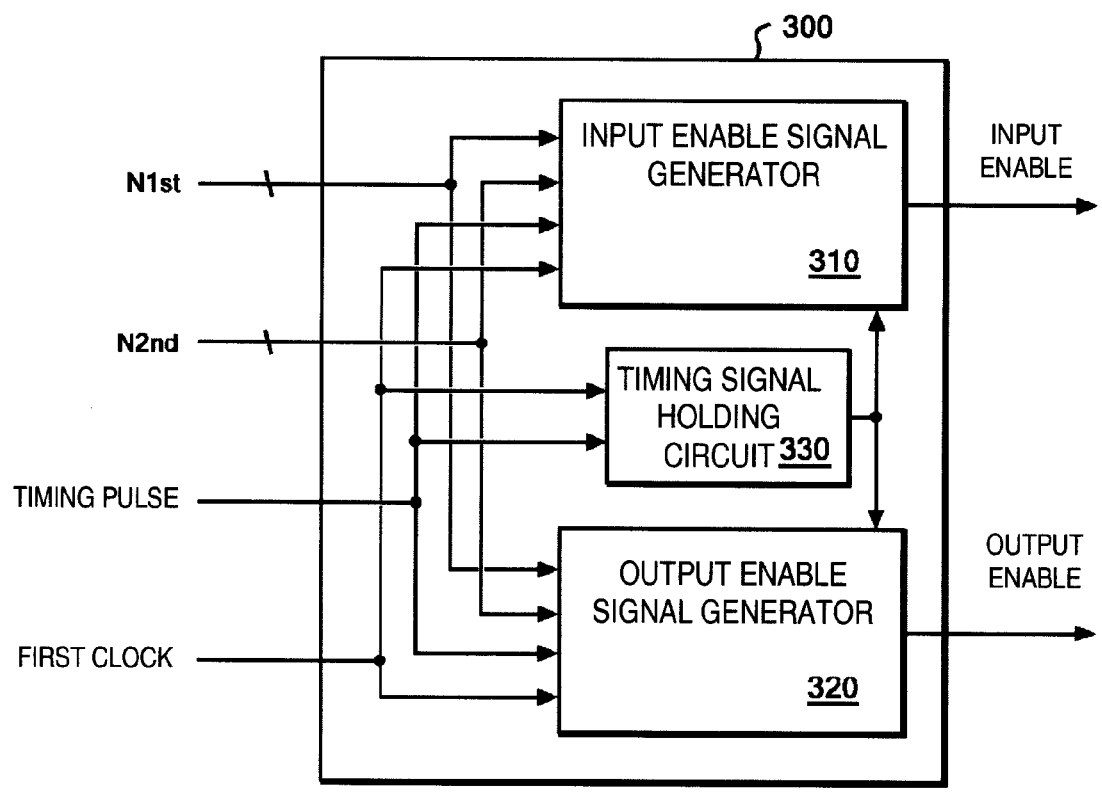
FIG. 13 is a circuit diagram showing an exemplary configuration of an enable signal generation circuit.

FIG. 13 shows an exemplary configuration of the enable signal generation circuit 300 in FIG. 8. The enable signal generation circuit 300 includes an input enable signal generator 310, an output enable signal generator 320, and a timing signal holding circuit 330. A signal that is output from the timing signal holding circuit 330 align with the edge signal. The input enable signal generator 310 and the output enable signal generator 320 each receive inputs of the value of $N_{1st}$, the value of $N_{2nd}$, the timing pulse, and the first clock. The input enable signal generator 310 outputs the input enable signal, and the output enable signal generator 320 outputs the output enable signal. The timing signal holding circuit 330 receives inputs of the timing pulse and the first clock. An output from the timing signal holding circuit 330 is applied to the input enable signal generator 310 and the output enable signal generator 320.

Figure 14:
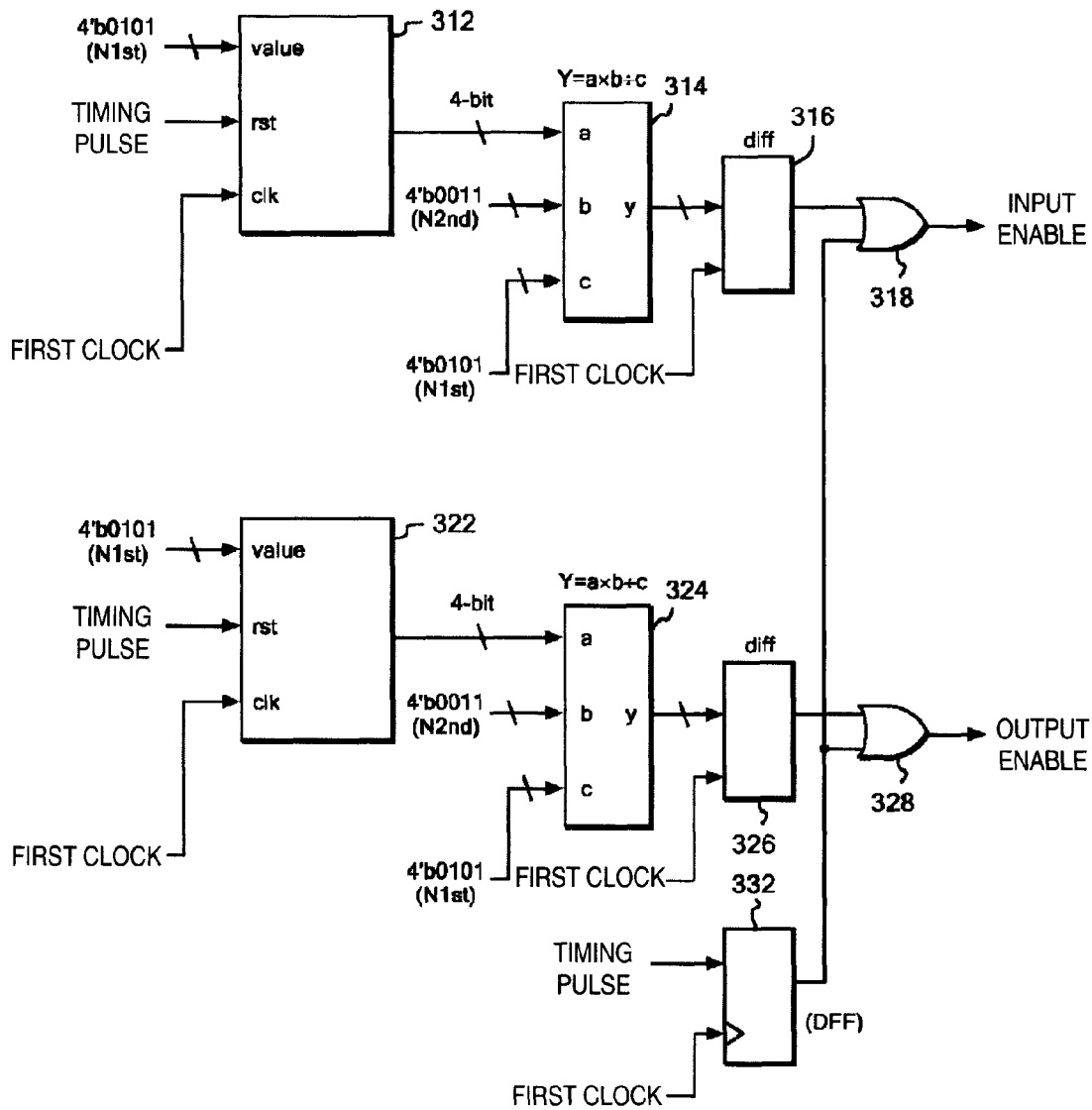
FIG. 14 is a circuit diagram illustrating details of the enable signal generation circuit.

FIG. 14 illustrates details of the enable signal generation circuit 300. The input enable signal generator 310 includes a count-down counter 312, a first operation circuit 314, a first differential circuit 316, and a first OR circuit 318. The output enable signal generator 320 includes a count-up counter 322, a second operation circuit 324, a second differential circuit 326, and a second OR circuit 328. The timing signal holding circuit 330 includes a signal holding circuit 332.

The count-down counter 312 receives an input of the number of clock pulses of the first clock $N_{1st}$ (a 4-bit value in the example), and is reset when the timing pulse is input. Upon being reset, the count-down counter 312 is set to $N_{1st}-1$ and performs count-down operation to 0 at the faster clock to output the count value $CNT_{down}$ (a 4-bit value in the example). The first operation circuit 314 receives inputs of the count value $CNT_{down}$, the number of clock pulses of the first clock $N_{1st}$, and the number of clock pulses of the second clock $N_{2nd}$ (a 4-bit value in the example) and calculates $CNT_{down}*N_{2nd}/N_{1st}$ to output the calculated value. The first differential circuit 316 operates at the first clock and receives an input of the calculated value of the first operation circuit. The first differential circuit 316 outputs 1 if the input calculated value is different from the previous value, and outputs 0 otherwise. The first OR circuit 318 ORs an input from the first differential circuit 316 and an input from the signal holding circuit 332 and provides an output as the input enable signal.

TABLE 1 example of generating enable signals (for clocks of 333 MHz and 200 MHz)

| Edge alignment points → | X | | | | | X | | | | | X | | |
| --- | --- | --- | --- | --- | --- | --- | --- | --- | --- | --- | --- | --- | --- |
| Time (ns) | 0 | 3 | 6 | 9 | 12 | 15 | 18 | 21 | 24 | 27 | 30 | 33 | 36 |
| $CNT_{down}$ | 4 | 3 | 2 | 1 | 0 | 4 | 3 | 2 | 1 | 0 | 4 | 3 | 2 |
| INT ($CNT_{down}$*3/5) | 2 | 1 | 1 | 0 | 0 | 2 | 1 | 1 | 0 | 0 | 2 | 1 | 1 |
| Input enable points | X | X | | X | | X | X | | X | | X | X | |
| $CNT_{up}$ | 0 | 1 | 2 | 3 | 4 | 0 | 1 | 2 | 3 | 4 | 0 | 1 | 2 |
| INT ($CNT_{up}$*3/5) | 0 | 0 | 1 | 1 | 2 | 0 | 0 | 1 | 1 | 2 | 0 | 0 | 1 |
| Output enable points | X | | X | X | X | X | | X | X | X | X | | X |

$N_{1st} = 5, N_{2nd} = 3$

The count-up counter 322 receives an input of the number of clock pulses of the first clock $N_{1st}$, and is reset when the timing pulse is input. Upon being reset, the count-down counter 312 is set to 0 and performs count-up operation to $N_{1st}-1$ at the first clock to output the count value $CNT_{up}$ (a 4-bit value in the example). The second operation circuit 324 receives inputs of the count value $CNT_{up}$, the number of clock pulses of the first clock $N_{1st}$, and the number of clock pulses of the second clock $N_{2nd}$ and calculates $CNT_{up}*N_{2nd}/N_{1st}$ to output the calculated value. The second differential circuit 326 operates at the faster clock and receives an input of the calculated value of the second operation circuit. The second differential circuit 326 outputs 1 if the input calculated value is different from the previous value, and outputs 0 otherwise. The second OR circuit 328 ORs an input from the second differential circuit 326 and an input from the signal holding circuit 332 and provides an output as the output enable signal.

The signal holding circuit 332 operates at the first clock and receives an input of the timing pulse. The signal holding circuit 332 holds the timing pulse and outputs the timing pulse to the first OR circuit 318 and the second OR circuit 328.

Now, the above-mentioned special case in which the output enable signal b and the input enable signal c overlap will be reviewed here. If $N_{1st}<2N_{2nd}-1$, the output enable signal and the input enable signal may overlap at points other than when edges of the both clocks align. Specifically, this is the case in which an output enable signal (e.g., the output enable signal b) based on an edge of a pulse of the second clock occurs at the same point as an input enable signal (e.g., the input enable signal c) based on an edge of a next pulse of the second clock. This case is defined as the special case.

Figure 15:
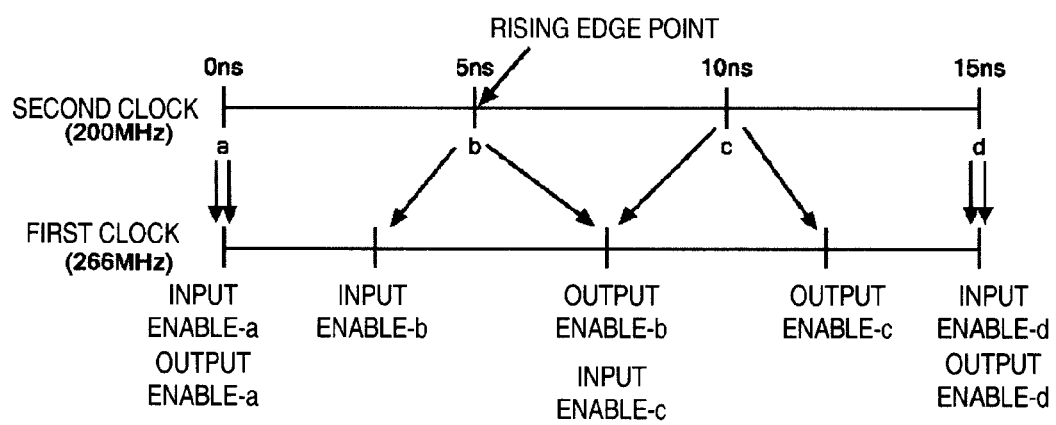
FIG. 15 is a diagram showing a timing example of the input and output enable signals determined in a special case.

For example, if the second clock is 200 MHz (a period of 5 ns) and the first clock is 266.666... MHz (a period of 3.75 ns, simply referred to as "266 MHz"), $N_{1st}$: $N_{2nd}$=4:3. Accordingly, 4<2*3-1=5, which applies to the special case. FIG. 15 shows the timings of the input and output enable signals determined in this case. In the example of FIG. 15, the output enable signal (output enable-b) for the edge b of the second clock (200 MHz) and the input enable signal (input enable-c) for the edge c of the second clock occur at the same point. In this special case, if the edge signal is generated by ANDing the input enable signal and the output enable signal in the circuit in FIGS. 8 and 9, the edge signal will be generated at a point when the input enable signal and the output enable signal for different pieces of data overlap, although the edges of the two clocks at that point do not coincide (align). Consequently, the data received with the input enable signal will be directly sent. Therefore, in this case, the edge signal cannot be generated with the AND operation. Also, the output cannot be fed back to the data holding circuit (cannot be used as one of input signals for the combinational circuit connected to the input D). However, the bidirectional data transfer as described above is possible without problems.

Figure 16:
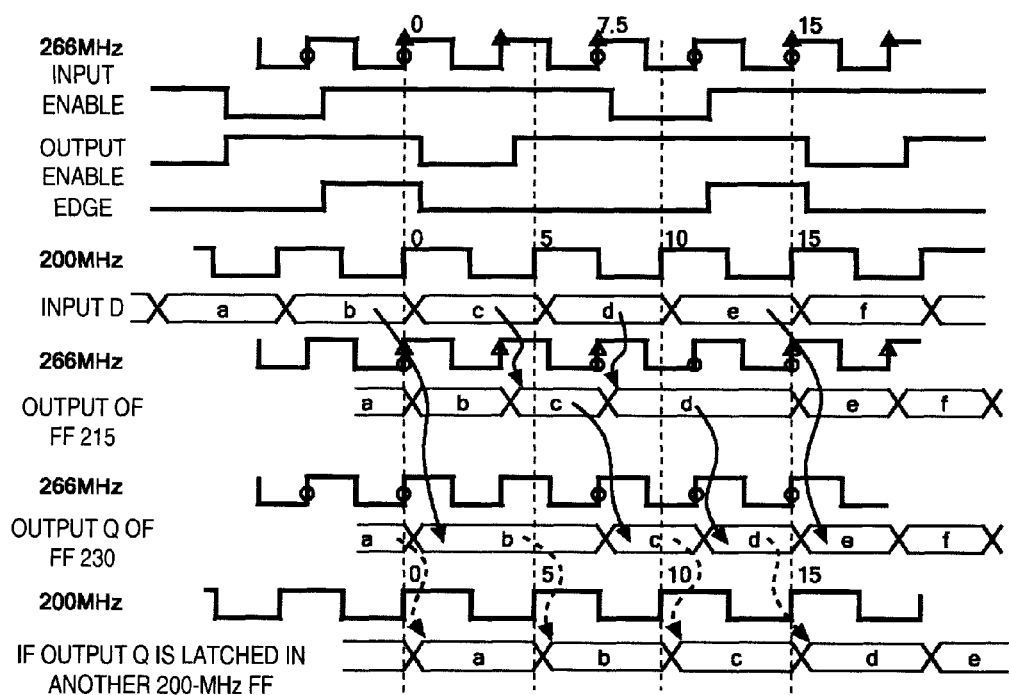
FIG. 16 is a timing waveform diagram in providing data based on a slower clock (200 MHz) in the special case.

FIG. 16 shows the timing as a waveform of each signal in a case that data from the clock domain using the slower second clock (200 MHz) is provided to the input D in the special case. FIG. 16 corresponds to FIG. 10. As shown in FIG. 16, the data from the 200-MHz clock domain to the input D is received at the FF 215 with the reception timing at edges marked with triangles, and sent to the output Q of the FF 230 with the sending timing at edges marked with circles. In this manner, the data can be output to the output Q at a data transfer rate of three times in 15 ns (a data transfer rate of 200 MHz) (see data transitions indicated by solid arrows).

Particularly, at the point of 7.5 ns, according to the input enable signal, data d is received at the FF 215 with the reception timing at the edge marked with the triangle. Simultaneously, data c already taken into the FF 215 with the reception timing according to the previous input enable signal is sent to the output Q of the FF 230 with the sending timing at the edge marked with the circle according to the output enable signal. Unless the edge signal is high (enabled) at this point, the data d received from the input D will not be directly sent to the output Q at once. Therefore no problems occur with the data transfer. Even if the data output to the output Q is further latched in another FF of 200 MHz, the data can be passed without data reordering or data loss (see data transitions indicated by dashed arrows). When clock edges of the both clocks of 200 MHz and 266 MHz align, the edge signal is high and the circuit operates in the same manner as a normal FF. That is, the data at the input D is output to the output Q of the FF 230 without being temporarily latched in the FF 215 (see data transitions at 0 ns and 15 ns).

Figure 17:
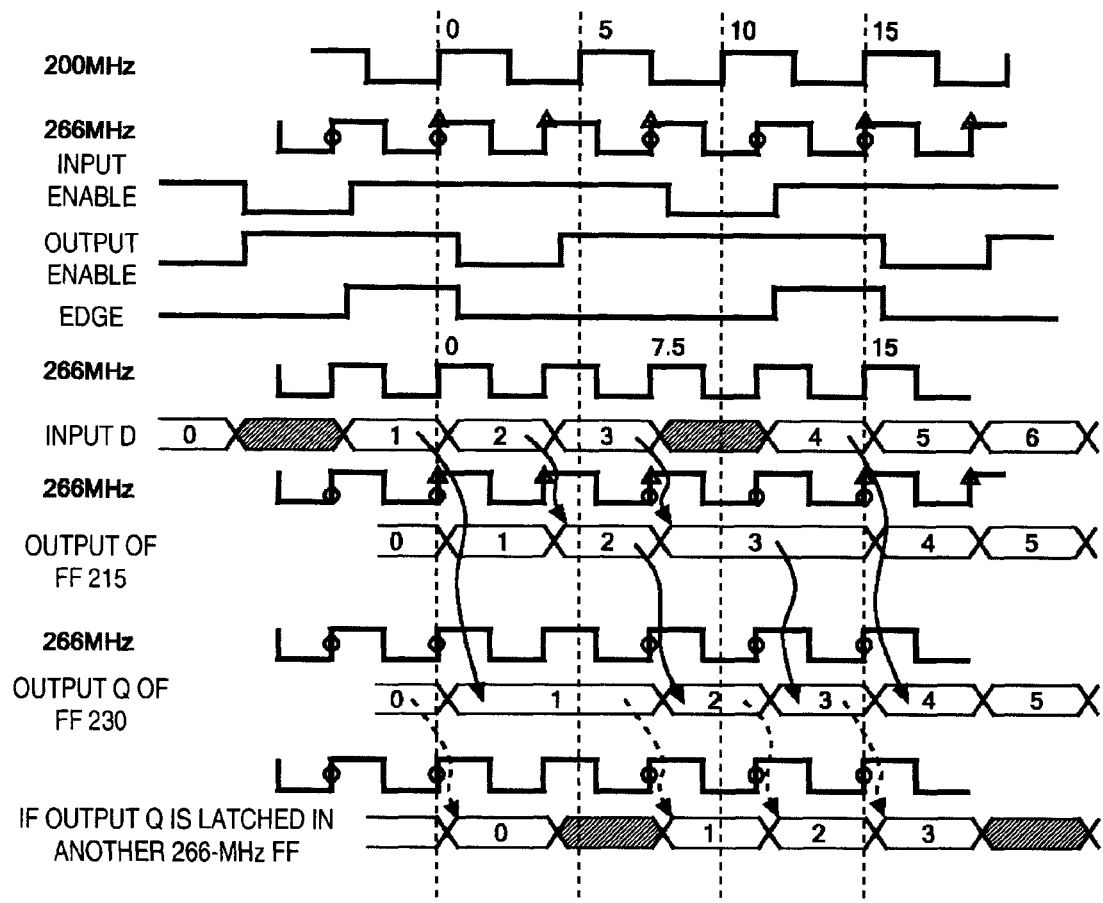
FIG. 17 is a timing waveform diagram in providing data based on a faster clock (266 MHz) in the special case.

FIG. 17 shows the timing as a waveform of each signal in a case that data from the clock domain using the faster first clock (266 MHz) is provided to the input D in the special case. FIG. 17 corresponds to FIG. 11. The data (0, 1, 2, 3, 4, ...) at the input D is received at the FF 215 with the reception timing at edges marked with triangles, and sent to the output Q of the FF 230 with the sending timing at edges marked with circles. In this manner, the data can be transferred at a data transfer rate of three times in 15 ns (a data transfer rate of 200 MHz) (see data transitions indicated by solid arrows).

Particularly, at the point of 7.5 ns, according to the input enable signal, the data 3 is received at the FF 215 with the reception timing at the edge marked with the triangle. Simultaneously, the data 2 already taken into the FF 215 with the reception timing according to the previous input enable signal is sent to the output Q of the FF 230 with the sending timing at the edge marked with the circle according to the output enable signal. Therefore no problems arise with the data transfer. Even if the data output to the output Q is further latched in another FF of 266 MHz, the data can be passed without data reordering or data loss (see data transitions indicated by dashed arrows) although the data is selectively passed. Again, when clock edges of the both clocks of 200 MHz and 266 MHz align, the edge signal is high and the circuit operates in the same manner as a normal FF. That is, the data at the input D is output to the output Q of the FF 230 without being temporarily latched in the FF 215 (see data transitions at 0 ns and 15 ns).

Figure 1:
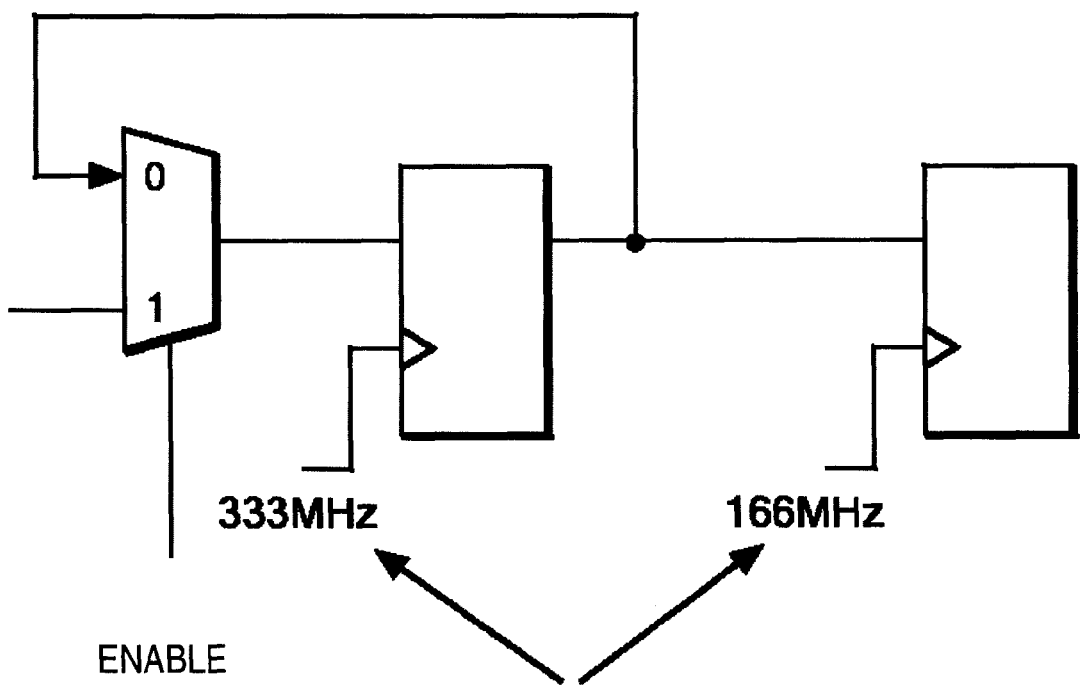
FIG. 1 is a diagram of a conventional circuit for using synchronous clocks to transfer data between clock domains.
Figure 2:
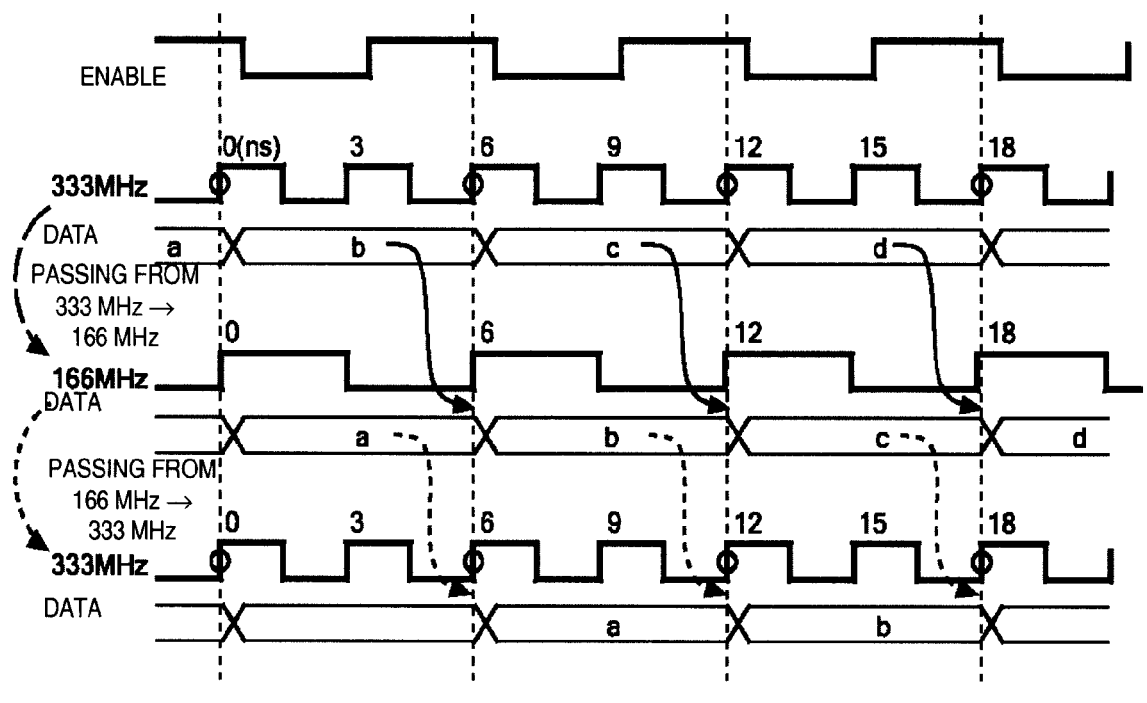
FIG. 2 is a waveform diagram in a conventional method for using synchronous clocks to transfer data between clock domains.
Figure 3:
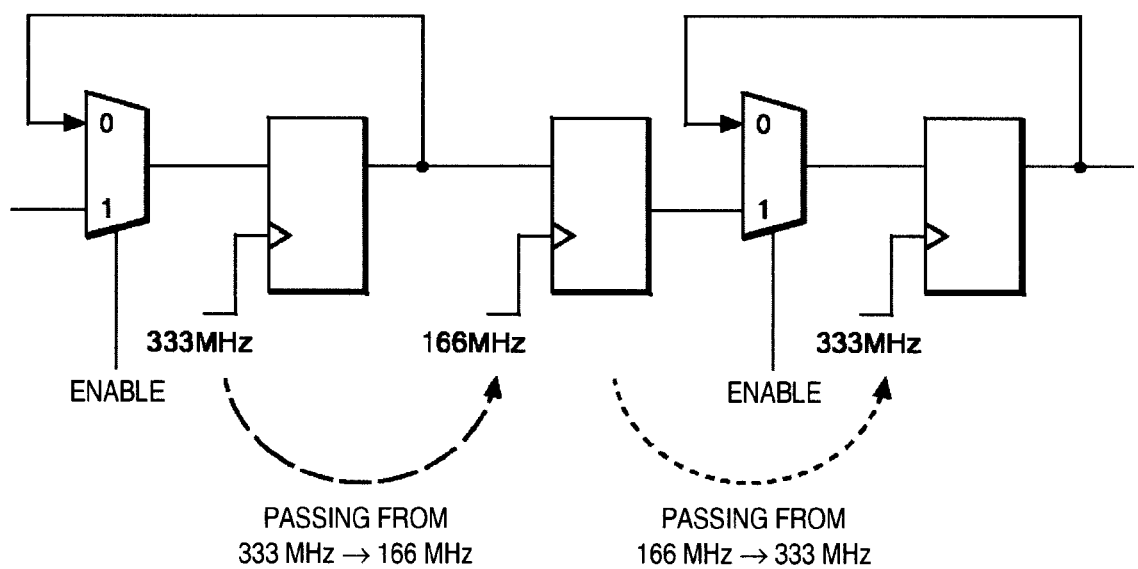
FIG. 3 is a diagram of a conventional circuit.
Figure 4:
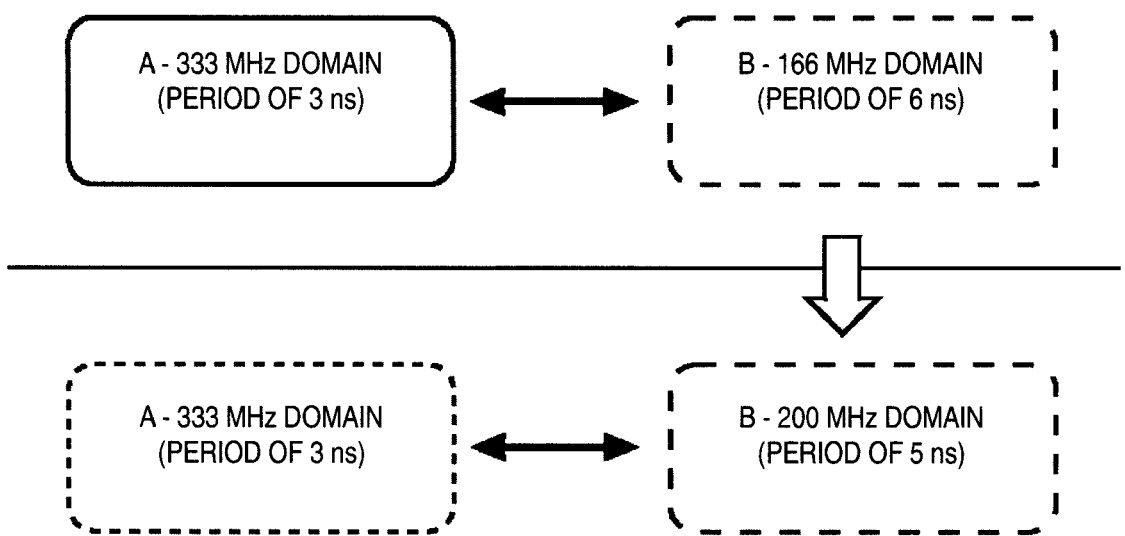
FIG. 4 is a diagram showing cases of clocks of clock domains.
Figure 5:
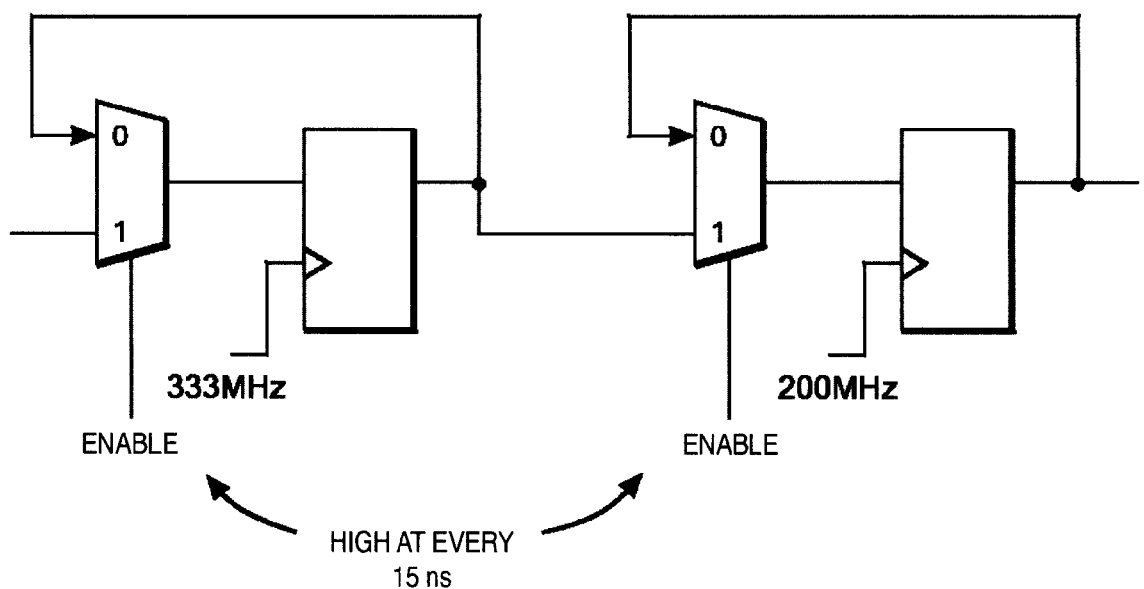
FIG. 5 is a diagram of another conventional circuit.
Figure 6:
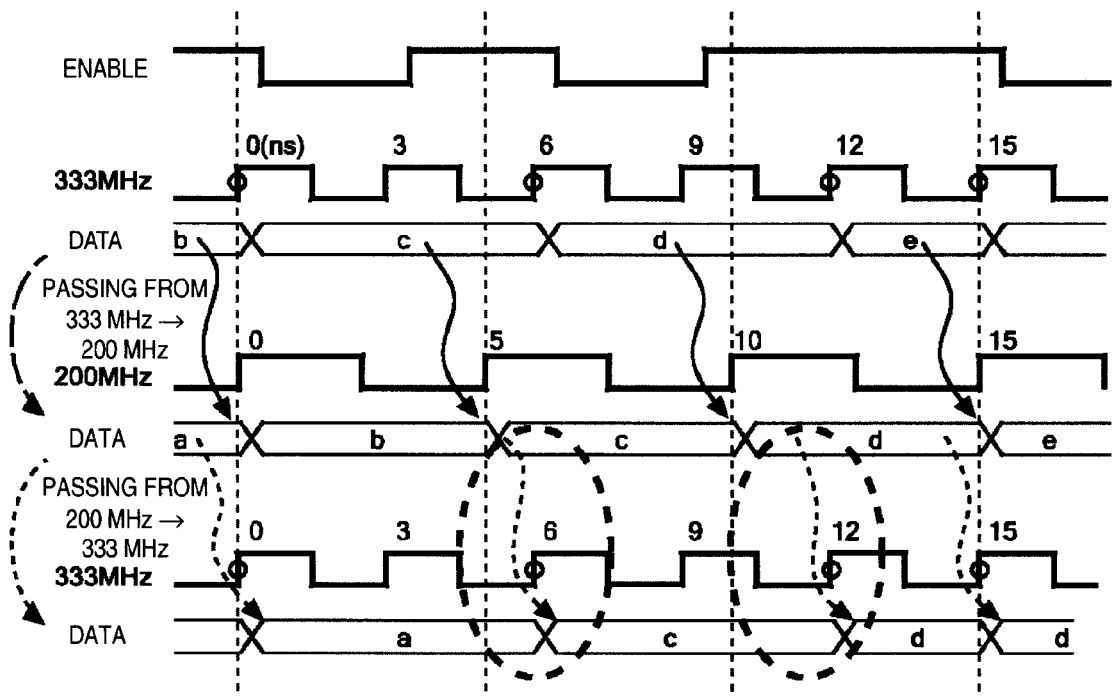
FIG. 6 is a waveform diagram in transferring data with 200-MHz timing.
Figure 7:
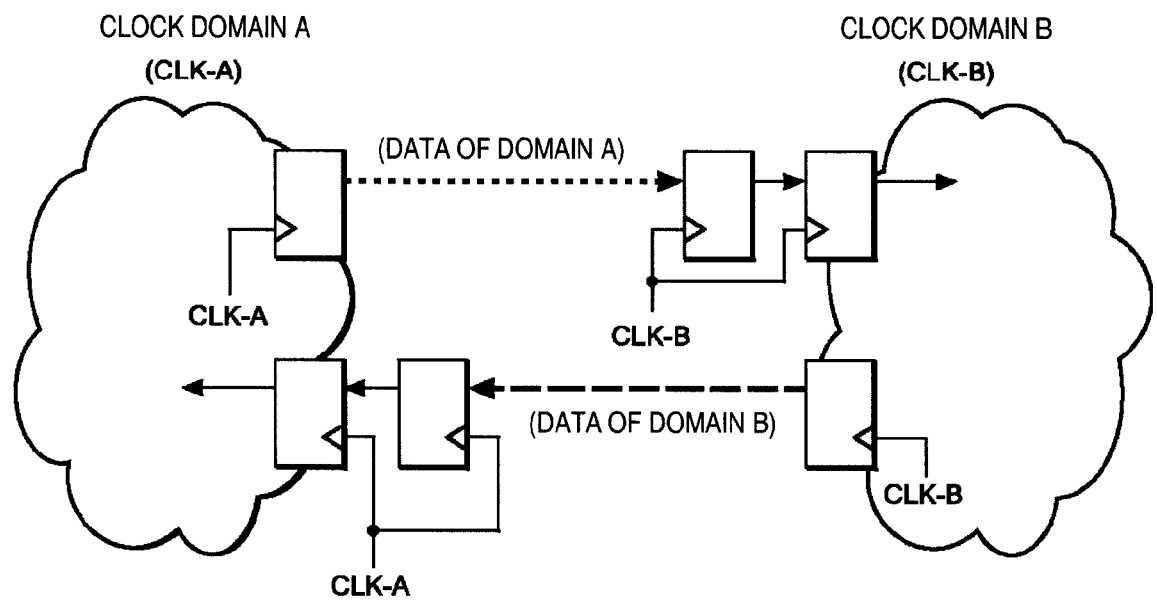
FIG. 7 is a diagram showing a configuration of conventional data transfer based on double latch.
Figure 18:
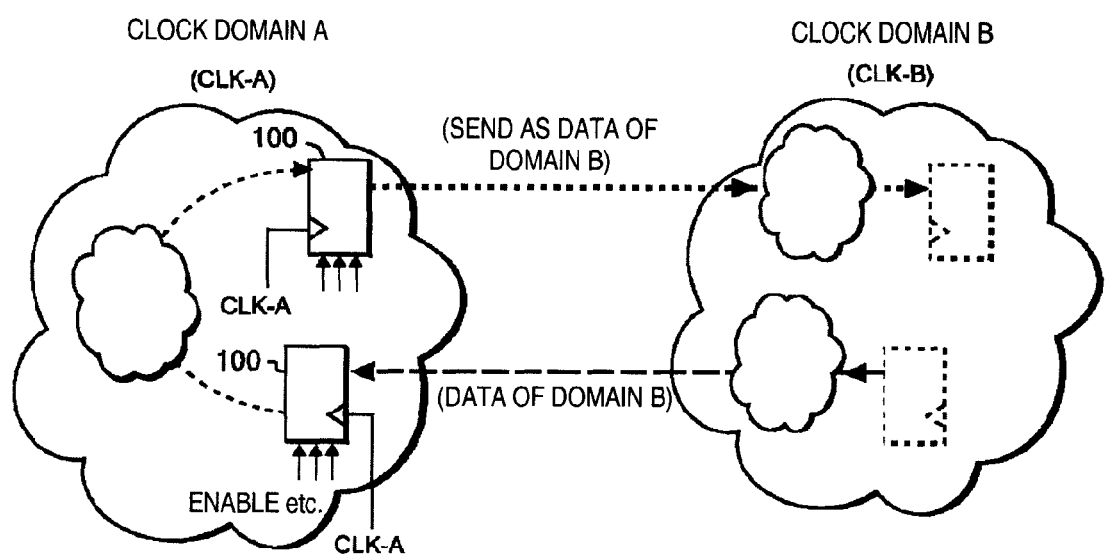
FIG. 18 is a diagram showing an exemplary configuration of data transfer using the data transfer circuit according to an embodiment of the present invention.

Thus, as described above, through the implementation of the present invention, data can be bi-directionally sent and received while an optimum data transfer rate (in the example, three times of transfer in 15 ns) is maintained, and connections to the both clock domains are possible without circuit modifications. Since the present invention is implemented as a synchronous circuit, functions can be verified through STA (Static Timing Analysis) and a logical simulation. In addition, when different clocks are used, the present invention is implemented in a circuit that operates at a clock of the faster clock domain. Therefore the circuit can be provided for each of data sending and data reception in a faster clock domain A (CLK-A), as shown in FIG. 18. Then, in a slower clock domain B (CLK-B), output data from the circuit (an input to the CLK-B) and input data to the circuit (an output from the CLK-B) can be similarly treated as data of the slower clock domain (no special processing is necessary in the CLK-B). This eliminates the need to provide a circuit such as a latch circuit in the slower clock domain as in the conventional data transfer shown in FIG. 7. Further, although conventionally the CDC connection circuit must be reviewed or redesigned when the clock combination is changed, now the same circuit can be used for the CDC connection portion as long as the slower clock frequency does not exceed the faster clock frequency (the first clock frequency≥the second clock frequency) (as long as the speed relationship does not change).

While the present invention has been described above with reference to the embodiments, the technical scope of the present invention is not limited to what has been described in the embodiments. Various modifications or improvements may be made to the embodiments, and it is apparent that aspects with such modifications or improvements are also included in the technical scope of the present invention.

The invention claimed is:

1. A data transfer circuit that transfers data between a first clock domain using a first clock and a second clock domain using a second clock synchronized with the first clock, comprising:
a data holding circuit operating at the first clock to receive, hold, and send the data; and
an enable signal generation circuit connected to the data holding circuit to generate an input enable signal allowing the data holding circuit to receive the data and an output enable signal allowing the data holding circuit to send the received data, the enable signal generation circuit being adapted to
enable the input enable signal and the output enable signal so that the input enable signal and the output enable signal are enabled when edges of the first clock and the second clock align, and,
for the first clock and the second clock in a case where the first clock is faster than the second clock,
enable the input enable signal so that the input enable signal is enabled at a predetermined one of edges of each clock pulse of the first clock precedent to and close to a predetermined one of edges of each clock pulse of the second clock occurring after the edge alignment in an interval between the edge alignment and a next edge alignment,
enable the output enable signal so that the output enable signal is enabled at a predetermined one of edges of each clock pulse of the first clock subsequent to and close to a predetermined one of edges of each clock pulse of the second clock occurring after the edge alignment, and
apply the input enable signal and the output enable signal to the data holding circuit,
wherein the enable signal generation circuit comprises:
a timing signal holding circuit operating at the first clock to receive, hold, and send a timing signal for the time when edges of the first clock and the second clock align;
an input enable signal generator operating at the first clock to receive inputs of the number of clock pulses of the first clock $N_{1st}$ and the number of clock pulses of the second clock $N_{2nd}$ between an edge alignment and a next edge alignment of the first clock and the second clock, and the timing signal, and generate the input enable signal; and
an output enable signal generator operating at the first clock to receive inputs of the $N_{1st}$, the $N_{2nd}$, and the timing signal, and generate the output enable signal.

2. The data transfer circuit according to claim 1, comprising an edge signal generation circuit connected to the data holding circuit, the edge signal generation circuit generating an edge signal allowing the data holding circuit to receive and send the data when edges of the first clock and the second clock align, and applying the edge signal to the data holding circuit.

3. The data transfer circuit according to claim 2, wherein the edge signal generation circuit generates the edge signal by ANDing the input enable signal and the output enable signal.

4. The data transfer circuit according to claim 1, wherein the input enable signal generator comprises:
a count-down counter that receives an input of the $N_{1st}$, is reset upon receiving an input of the timing signal, is set to $N_{1st}-1$ upon being reset, performs count-down operation to 0 at the first clock, and outputs a count value $CNT_{down}$;
a first operation circuit connected to the count-down counter to receive inputs of the $CNT_{down}$, the $N_{1st}$, and the $N_{2nd}$, calculate $CNT_{down}*N_{2nd}/N_{1st}$, and output a calculated value;
a first differential circuit operating at the first clock and connected to the first operation circuit to receive an input of the calculated value of the first operation circuit and to output 1 if the input calculated value is different from a previous value and output 0 otherwise; and
a first OR circuit connected to the first differential circuit and the timing signal holding circuit to OR an input from the first differential circuit and an input from the timing signal holding circuit and provide an output as the input enable signal, and
the output enable signal generator comprises:
a count-up counter that receives an input of the $N_{1st}$, is reset upon receiving an input of the timing signal, is set to 0 upon being reset, performs count-up operation to $N_{1st}-1$ at the first clock, and outputs a count value $CNT_{up}$;
a second operation circuit connected to the count-up counter to receive inputs of the $CNT_{up}$, the $N_{1st}$, and the $N_{2nd}$, calculate $CNT_{up}*N_{2nd}/N_{1st}$, and output a calculated value;
a second differential circuit operating at the first clock and connected to the second operation circuit to receive an input of the calculated value of the second operation circuit and to output 1 if the input calculated value is different from a previous value and output 0 otherwise; and
a second OR circuit connected to the second differential circuit and the timing signal holding circuit to OR an input from the second differential circuit and an input from the timing signal holding circuit and provide an output as the output enable signal.

5. The data transfer circuit according to any one of claim 4, wherein the data holding circuit comprises a flip-flop circuit.

6. A data transfer method for transferring data between a first clock domain using a first clock and a second clock domain using a second clock synchronized with the first clock, comprising:
operating a data holding circuit at the first clock;
enabling an input enable signal allowing the data holding circuit to receive the data and an output enable signal allowing the data holding circuit to send the received data so that the input enable signal and the output enable signal are enabled when edges of the first clock and the second clock align;
for the first clock and the second clock in a case where the first clock is faster than the second clock,
enabling the input enable signal so that the input enable signal is enabled at a predetermined one of edges of each clock pulse of the first clock precedent to and close to a predetermined one of edges of each clock pulse of the second clock occurring after the edge alignment in an interval between the edge alignment and a next edge alignment;

applying the input enable signal to the data holding circuit to receive the data at the data holding circuit;

enabling the output enable signal so that the output enable signal is enabled at a predetermined one of edges of each clock pulse of the first clock subsequent to and close to a predetermined one of edges of each clock pulse of the second clock occurring after the edge alignment; and applying the output enable signal to the data holding circuit to send the received data from the data holding circuit, where $N_{1st}$ and $N_{2nd}$ denote the number of clock pulses of the first clock and the number of clock pulses of the second clock, respectively, between an edge alignment and a next edge alignment of the first clock and the second clock, $CNT_{down}$ denotes a cyclical counter value starting at a point of an edge alignment of the first clock and the second clock and counted down as $N_{1st}-1, N_{1st}-2, \ldots, 1, 0, N_{1st}-1, N_{1st}-2, \ldots$, $CNT_{up}$ denotes a cyclical counter value starting at the point of the edge alignment and counted up as $0, 1, \ldots, N_{1st}-2, N_{1st}-1, 0, 1, \ldots$, and INT(a) denotes a function that discards a fractional portion of a value of a, the method comprising:

generating the input enable signal to be enabled at a point when a value of $INT(CNT_{down}*N_{2nd}/N_{1st})$ changes and at the point of the edge alignment, and to be disabled at other points; and generating the output enable signal to be enabled at a point when a value of $INT(CNT_{up}*N_{2nd}/N_{1st})$ changes and at the point of the edge alignment, and to be disabled at other points.

7. The data transfer method according to claim 6, comprising generating an edge signal allowing the data holding circuit to receive and send the data when edges of the first clock and the second clock align, and applying the edge signal to the data holding circuit to receive the data at the data holding circuit and send the data from the data holding circuit.

8. The data transfer method according to claim 7, wherein generating the edge signal comprises generating the edge signal by ANDing the input enable signal and the output enable signal.

9. The data transfer method according to any one of claim 6, wherein the predetermined one of the edges of each clock pulse of the first clock and the predetermined one of the edges of each clock pulse of the second clock are rising edges or falling edges.

10. The data transfer method according to any one of claim 7, wherein the predetermined one of the edges of each clock pulse of the first clock and the predetermined one of the edges of each clock pulse of the second clock are rising edges or falling edges.

11. The data transfer method according to any one of claim 8, wherein the predetermined one of the edges of each clock pulse of the first clock and the predetermined one of the edges of each clock pulse of the second clock are rising edges or falling edges.

* * * * *